(12) United States Patent
Wen (10) Patent No.: US 8,498,400 B2
(45) Date of Patent: Jul. 30, 2013

(54) METHOD AND SYSTEM FOR IMPLEMENTING NUMBER PORTABILITY SERVICE

(75) Inventor: Changcheng Wen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 650 days.

(21) Appl. No.: 12/638,535

(22) Filed: Dec. 15, 2009

(65) Prior Publication Data

US 2010/0091977 A1 Apr. 15, 2010

Related U.S. Application Data

(63) Continuation of application No. PCT/CN2008/072169, filed on Aug. 27, 2007.

(30) Foreign Application Priority Data

Aug. 27, 2007 (CN) .......................... 2007 1 0148005

(51) Int. Cl.
*H04M 7/00* (2006.01)
(52) U.S. Cl.
USPC ................................ 379/221.13; 379/220.01
(58) Field of Classification Search
USPC ............ 379/221.13, 220.01, 221.01; 370/352
See application file for complete search history.

(56) References Cited

U.S. PATENT DOCUMENTS

| | | | | |
|---|---|---|---|---|
| 5,764,745 A | * | 6/1998 | Chan et al. ............... | 379/221.13 |
| 6,006,098 A | * | 12/1999 | Rathnasabapathy et al. . | 455/461 |
| 6,154,534 A | * | 11/2000 | Bredberg et al. ........ | 379/221.13 |
| 6,377,793 B1 | | 4/2002 | Jenkins | |
| 7,027,582 B2 | * | 4/2006 | Khello et al. ............ | 379/220.01 |
| 7,127,057 B2 | * | 10/2006 | Delaney et al. .......... | 379/221.13 |
| 7,139,568 B2 | | 11/2006 | Kim | |

(Continued)

FOREIGN PATENT DOCUMENTS

CN 1358017 A 7/2002
CN 1431837 A 7/2003

(Continued)

OTHER PUBLICATIONS

Translation of the Written Opinion of the International Searching Authority, mailed Dec. 4, 2008, in corresponding International Application No. PCT/CN2008/072169 (3 pp.).

*Primary Examiner* — William Deane, Jr.
(74) *Attorney, Agent, or Firm* — Staas & Halsey LLP (57) ABSTRACT

A method for implementing a number portability (NP) service includes: by a local NP database, receiving a called user number from a switching device; determining an NP database storing NP data of the callee according to a preset correspondence between the called number and identifiers (IDs) of NP databases storing the NP data of the callee; and obtaining the NP data of the callee from the determined NP database and returning the obtained NP data to the switching device so that the switching device routes a call to the callee according to the returned NP data. In addition, a system for implementing an NP service is provided, including an NP database and a switching device. Two types of NP databases are also provided. With the present invention, each NP database only needs to store partial NP data, which lessens the load of each NP database in storing and updating NP data.

15 Claims, 7 Drawing Sheets

U.S. PATENT DOCUMENTS

| | | | |
|---|---|---|---|
| 7,787,445 B2 * | 8/2010 | Marsico | 370/352 |
| 7,860,231 B2 * | 12/2010 | Florkey et al. | 379/221.13 |
| 2001/0029182 A1 * | 10/2001 | McCann et al. | 455/433 |
| 2002/0176562 A1 | 11/2002 | Hao | |
| 2003/0007482 A1 * | 1/2003 | Khello et al. | 370/352 |
| 2004/0053610 A1 * | 3/2004 | Kim | 455/432.1 |
| 2005/0101297 A1 * | 5/2005 | Delaney et al. | 455/412.1 |
| 2005/0251509 A1 * | 11/2005 | Pontius | 707/3 |
| 2007/0203909 A1 * | 8/2007 | Marathe | 707/7 |

FOREIGN PATENT DOCUMENTS

| | | |
|---|---|---|
| CN | 1477805 A | 2/2004 |
| CN | 1492701 A | 4/2004 |
| CN | 1552150 A | 12/2004 |
| CN | 1578500 A | 2/2005 |
| CN | 1691787 A | 11/2005 |
| CN | 10137850 B | 9/2011 |
| WO | 03005664 A2 | 1/2003 |

* cited by examiner

METHOD AND SYSTEM FOR IMPLEMENTING NUMBER PORTABILITY SERVICE

CROSS-REFERENCE TO RELATED APPLICATIONS

This application is a continuation of International Application No. PCT/CN2008/072169, filed on Aug. 27, 2008, which claims priority to Chinese Patent Application No. 200710148005.9, filed on Aug. 27, 2007, both of which are hereby incorporated by reference in their entireties.

FIELD OF THE INVENTION

The present invention relates generally to mobile service technologies, and in particular, to a method and system for implementing an NP service, and number portability (NP) database.

BACKGROUND OF THE INVENTION

A telephone network includes multiple telephone exchanges that are interconnected through trunk lines and signaling networks. A telephone user belongs to a specified telephone exchange, usually the exchange where the telephone user opens an account. NP means that telephone users can change their access points and even their operators, without changing their telephone numbers. As required by the times, the NP technology meets the requirement for keeping original telephone numbers when people change their addresses and working places, breaks the monopoly, and facilitates users to choose freely among different operators. NP appears first in fixed telephone networks and then in mobile telephone networks. In the countries and regions where mobile services develop fast, mobile NP develops fast.

Figure 1:
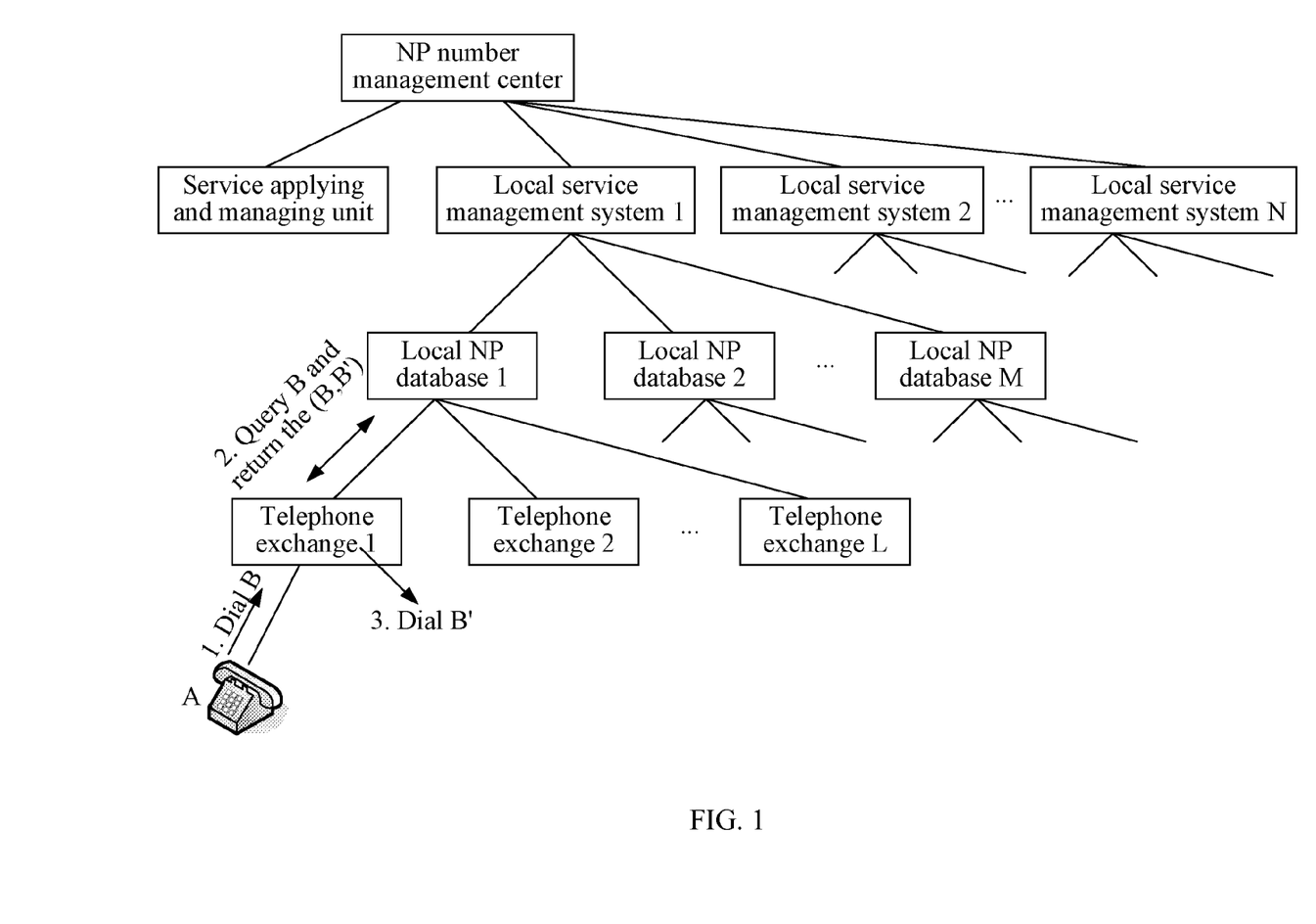
FIG. 1 is a networking diagram for implementing an NP service in the prior art.

An NP service is a service in which resources are shared inside a telephone network. FIG. 1 shows a networking diagram for implementing an NP service in the prior art. As shown in FIG. 1, when the access point of a user changes, a service applying and managing unit submits the NP data ((B, B') of the user to an NP number management center. In the (B, B'), B indicates a called user number and B' indicates the routing number of the new access point. As a data center controlled by the telephone supervision department, the NP number management center is a network-wide infrastructure and is used to check the validity of the (B, B') and deliver the valid (B, B') to various local service management systems. Each local service management system delivers the received (B, B') to the connected local NP databases. Each local NP database records the NP data of each user.

When user A calls user B, the access telephone exchange of user A receives the call, queries the local NP database for B' of the new access point of user B, and routes B' to user B.

During the implementation of the present invention, the inventor discovers at least the following problems in the prior art:

(1) Each local NP database needs to store the NP data of all the users on the network, which requires that each local NP database should have a large storage space. The updated NP data of any user on the telephone network needs to be synchronized to each local NP database as soon as possible, which occupies the processing resources of each local NP database. In addition, each local NP database stores the data of all the users on the network, which causes possible security problems.

(2) The NP data is transmitted through the NP number management center, local service management system, and local NP database. The local service management system only supports data relay, which increases the complexity and investments.

SUMMARY OF THE INVENTION

The embodiments of invention related to a method and system for implementing an NP service, and NP database to lessen the storage and processing load of an NP database.

Embodiments of the present disclosure provide a method for implementing an NP service, including:

receiving, by a local NP database, a called user number from a switching device;

determining, by the local NP database, an NP database storing NP data of the callee according to a preset correspondence between the called number and identifiers (IDs) of NP databases storing the NP data of the callee; and obtaining, by the local NP database, the NP data of the callee from the determined NP database and returning the obtained NP data to the switching device so that the switching device routes a call to the callee according to the returned NP data.

Embodiments of the present disclosure provide a method for implementing an NP service, including:

receiving, by an NP delivery database, NP data;

determining, by the NP delivery database, at least one of NP databases storing the NP data of the users according to preset correspondences between the called number and IDs of NP databases storing the NP data of users; and sending, by the NP delivery database, the NP data to the determined at least one of NP databases so that the NP databases storing the NP data may provide an NP service.

Embodiments of the present disclosure provide a system for implementing an NP service which includes an NP database and a switching device, where the NP database includes an NP delivery database and a local NP database and the NP database is in communication with a switching device;

the NP delivery database receives NP data selects at least one of NP databases storing the received NP data according to an user number in the NP data, and sends the received NP data to at least one of the selected NP databases;

the local NP database receives a called user number from a telephone exchange, determines an NP database storing the NP data of the callee according to the received called number, obtains the NP data of the callee from the determined NP database, and sends the obtained NP data to the switching device; and the switching device receives a call from a caller, sends the called number to the local NP database where the caller resides, and routes the call to the callee according to the NP data returned from the local NP database.

Embodiments of the present invention provide an NP database which includes an NP data transceiving module and an NP data storage determining module, where the NP data transceiving module is capable of communicating with an NP data storage determining module;

the NP data transceiving module receives NP data, sends an user number in the received NP data to the NP data storage determining module, receives the NP database ID from the NP data storage determining module, and sends the NP data to at least one of the NP databases corresponding to the received NP database ID; and the NP data storage determining module calculates the NP database ID storing the NP data of the user according to the received user number from the NP data transceiving module and sends the calculated NP database ID to the NP data transceiving module.

Embodiments of the present disclosure provide an NP database which includes an NP data querying and receiving module and an NP data storage determining module, where the NP data querying and receiving module is capable of communicating with an NP data querying module;

the NP data querying and receiving module receives a called user number from a switching device, sends the received called number to the NP data storage determining module, receives an NP database ID from the NP data storage determining module, obtains the NP data corresponding to the user number from the NP database corresponding to the received NP database ID, and sends the obtained NP data to the switching device so that the switching device may route the call to the callee according to the received NP data; and the NP data storage determining module receives the called number from the NP data querying and receiving module, calculates the NP database ID storing the NP data of the callee according to the called number, and sends the calculated NP database ID to the NP data querying and receiving module.

In the embodiments of the present invention, the NP data generated by a user is stored to the NP databases selected according to the called number so that each NP database needs to store only partial NP data and the load of each NP database in storing and updating NP data is lessened, which is different from the prior art. In addition, a specified algorithm is used to determine the NP database storing NP data, which improves the security of NP data.

Moreover, in the embodiments of the present invention, no local service management system is required and the NP number management center may directly send NP data to NP databases. This simplifies the transmission of NP data and the network architecture for implementing the NP service. In addition, the NP data may be stored to multiple NP databases so that the reliability of the NP service is improved.

BRIEF DESCRIPTION OF THE DRAWINGS

To make the technical solution under the present invention or in the prior art clearer, the accompanying drawings for illustrating the embodiments of the present invention or illustrating the prior art are outlined below. Evidently, the accompanying drawings are exemplary only, and those skilled in the art can derive other drawings from such accompanying drawings without creative work.

DETAILED DESCRIPTION OF THE INVENTION

The technical solution of the present invention is hereinafter described in detail with reference to the accompanying drawings. It is evident that the embodiments are exemplary only and the present invention is not limited to such embodiments. Other embodiments that those skilled in the art derive from the embodiments of the present invention without creative work also fall in the scope of protection of the present invention.

The implementation of an NP service includes two processes:

(1) NP service delivering process: indicates the process of delivering new routing information to the NP database on the telephone network after the access point of a telephone user changes inside the telephone network.

(2) NP service querying process: indicates the process of querying the NP database to obtain the current access point of a telephone user when the telephone user is called.

Figure 2:
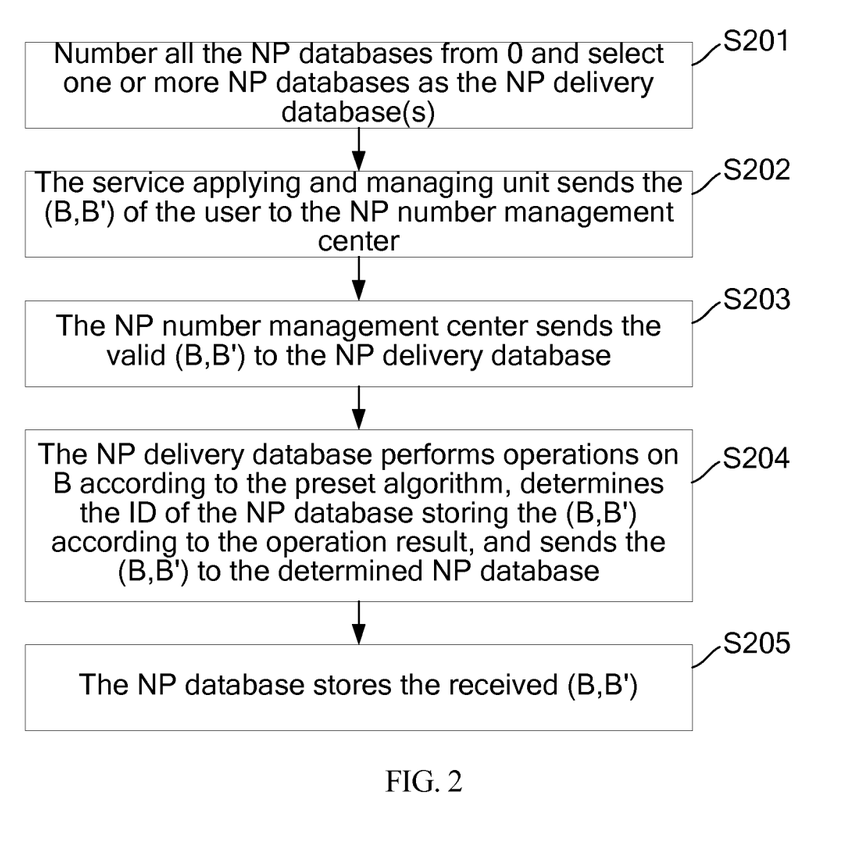
FIG. 2 shows a process of delivering an NP service in a first embodiment of the present invention.

FIG. 2 shows a process of delivering an NP service in an embodiment of the present invention. The process includes the following steps:

S201. Number all the NP databases from 0, such as NP database 0, NP database 1, . . . , NP database n−1, and select one or more NP databases as the NP delivery database(s). The NP number management center stores the IDs of the selected NP delivery databases.

n is a positive integer. Optionally, the administrator may select NP delivery databases and store the IDs of the selected NP delivery databases to the NP number management center.

S202. The service applying and managing unit determines the user who generates NP data and sends the (B, B') of the user to the NP number management center, where B indicates a called user number and B' indicates a current routing number.

S203. The NP number management center checks whether the received (B, B') is valid and sends the valid (B, B') to the NP delivery database.

To ensure the reliability of delivering NP data, more NP delivery databases may be set. In this case, the NP number management center sends the valid (B, B') to one NP delivery database that is currently available. For example, the NP number management center first sends the valid (B, B') to the NP delivery database with the smallest ID according to the IDs of various NP delivery databases. If the NP delivery database returns a success response, the NP number management center determines that the NP data is successfully delivered this time. Otherwise, the NP number management center continues to send the valid (B, B') to the NP delivery database with the second smallest ID until the NP data is successfully delivered.

S204. The NP delivery database performs operations on B according to the preset algorithm, determines the ID(s) of one or more NP databases storing the (B, B') according to the operation result, and sends the (B, B') to the determined NP database(s).

In this step, the preset algorithm may be a function with B as the input, such as a Hash function.

Optionally, the ID of the NP database to which the (B, B') is sent may be determined as follows according to the operation result:

If the operation result is a, the IDs of the NP databases to which the (B,B') is sent are a%n, (a+p)%n, (a+2p)%n, . . . , (a+(m−1)*p)%n, where, m is a preset integer, indicating the number of NP databases to which the (B,B') is sent; p is a preset positive integer; and % indicates a modulo operation.

S205. The NP database stores the received (B, B').

The (B, B') described in the embodiment shown in FIG. 2 is classified into the following cases:

Case 1: B and B' are both E.164 numbers.

Case 2: B is an E.164 number and B' is a uniform resource locator (URL). For example, B is 07552878000 and B' is abc@sohu.com.

Case 3: B and B' are both URLs.

Case 4: B is a URL and B' is an E.164 number.

Case 5: B is a service application number of a telephone network and B' is an E.164 number. For example, B is 8008302118 (a free telephone service number) and B' is 075528560000.

Case 6: B is a service application number of a telephone network and B' is a URL. For example, B is 8008302118 (a free telephone service number) and B' is service@huawei.com.

In cases 1 to 4, the frequency of generating NP data by users may be high. For example, a user uses B for communications after work and uses B' for communications at work. In this way, the user needs to report and cancel the (B, B') once each time the user starts to work or is off duty. It is very inconvenient if the user reports the (B, B') to the service applying and managing unit such as a business hall each time. Thus, the user may directly report the (B, B') to the home telephone exchange to speed up the reporting. To solve this issue, a process of delivering an NP service is provided in the second embodiment of the present invention.

Figure 3:
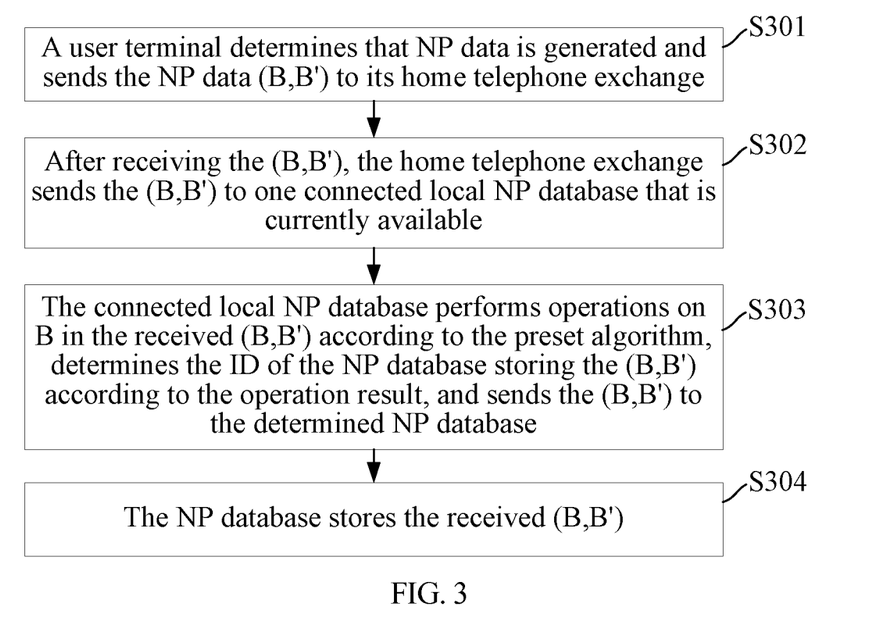
FIG. 3 shows a process of delivering an NP service in a second embodiment of the present invention.

FIG. 3 shows a process of delivering an NP service in the second embodiment of the present invention. In this embodiment, each NP database also acts as an NP delivery database. As shown in FIG. 3, the process includes the following steps:

S301. A user terminal determines that NP data is generated and sends the NP data (B, B') to its home telephone exchange.

S302. After receiving the (B, B'), the home telephone exchange sends the (B,B') to one connected local NP database that is currently available.

S303. The connected local NP database performs operations on B in the received (B, B') according to the preset algorithm, determines the ID(s) of one or more NP databases storing the (B, B') according to the operation result, and sends the (B, B') to the determined NP database(s).

S304. The NP database stores the received (B, B').

Figure 4:
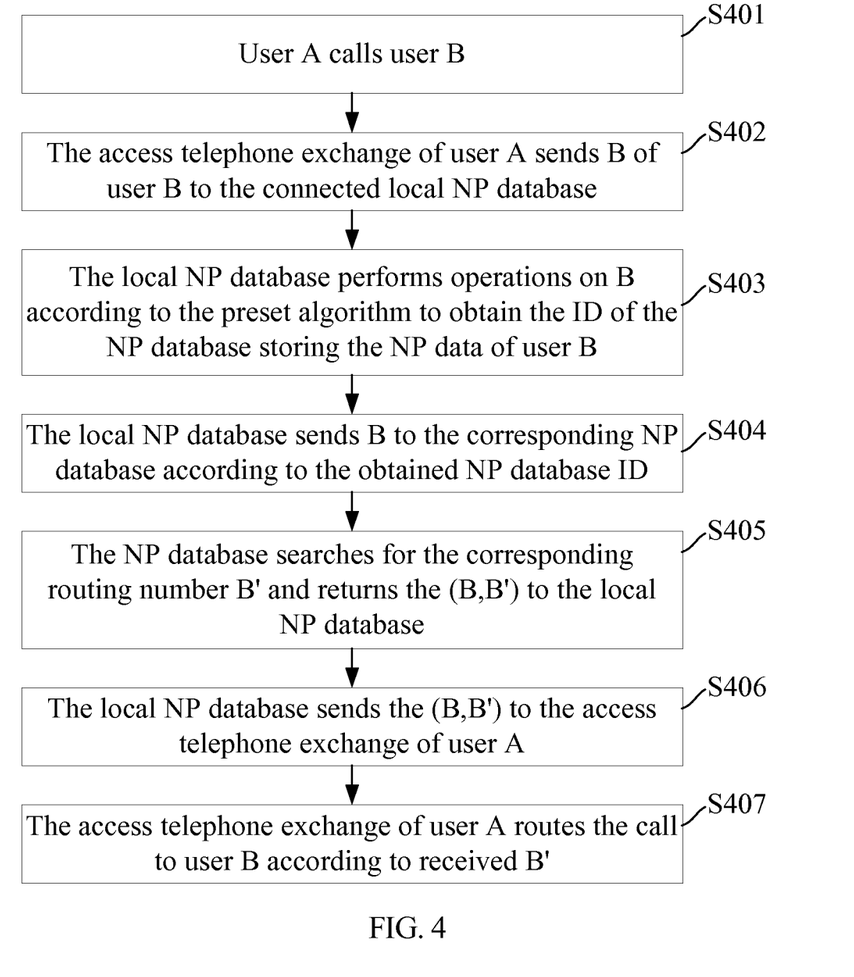
FIG. 4 shows a process of querying an NP service in an embodiment of the present invention.

FIG. 4 shows a process of querying an NP service in an embodiment of the present invention. The process includes the following steps:

S401. User A calls user B.

S402. The access telephone exchange of user A receives the call and sends the telephone number (hereinafter referred to as B) of user B to the connected local NP database.

S403. The local NP database performs operations on B according to the preset algorithm to obtain the ID of the NP database storing the NP data of user B.

The algorithm used by the local NP database must be the same as that used by the NP delivery database to deliver the (B, B').

S404. The local NP database sends B to the corresponding NP database according to the obtained NP database ID.

Suppose that the same NP data is stored to multiple NP databases when the NP service is delivered. In step S403, the local NP database may obtain multiple NP database IDs. In step S404, the local NP database may first send B to the NP database with the smallest ID according to the NP database IDs. If no response is received from the NP database, the local IP database continues to send B to the NP database with the second smallest ID until the response from the NP database is received.

S405. After receiving B, the NP database searches for the corresponding routing number B' and returns the (B, B') to the local NP database.

S406. The local NP database sends the (B, B') to the access telephone exchange of user A.

S407. The access telephone exchange of user A routes the call to user B according to received B'.

Figure 5:
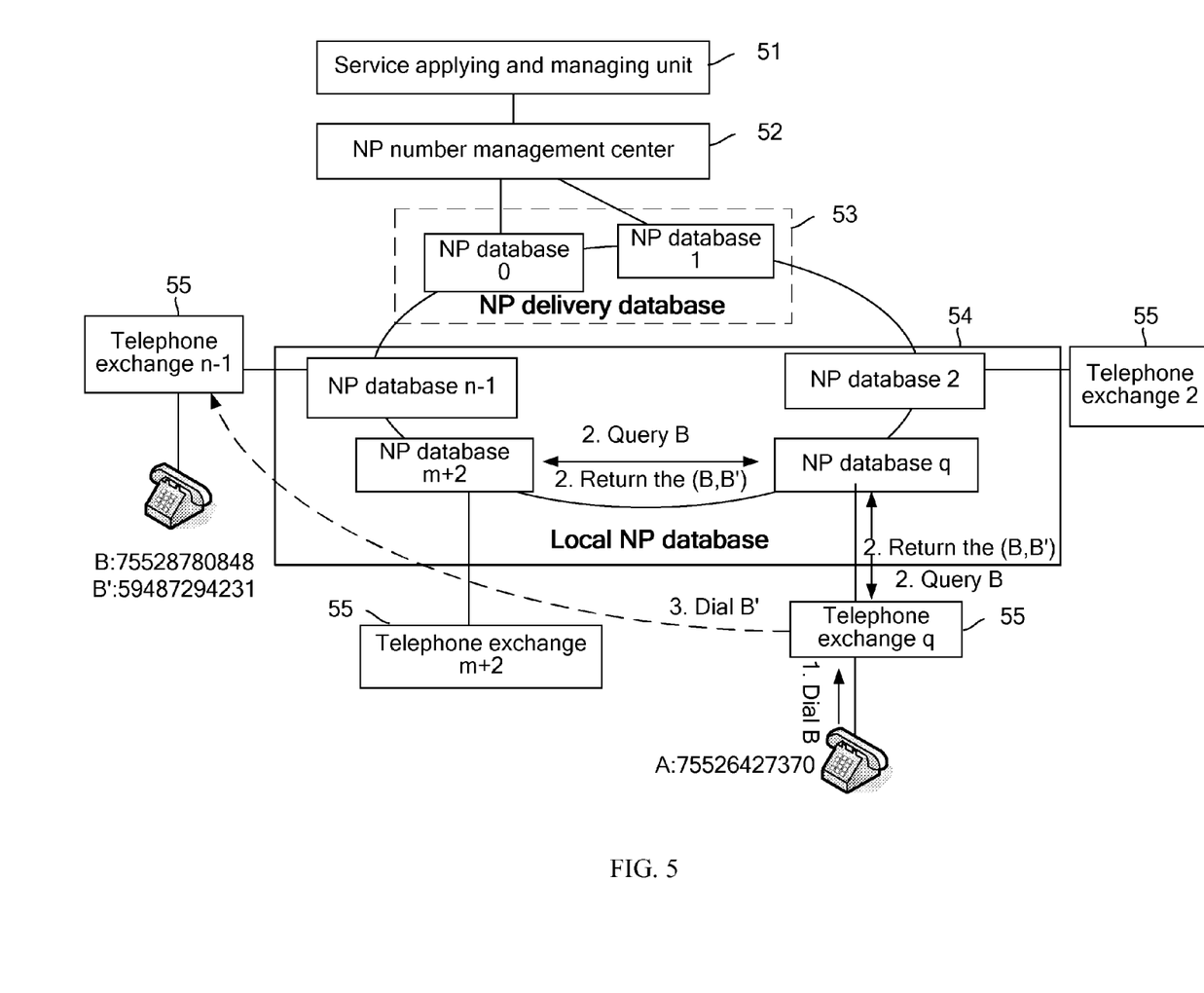
FIG. 5 is a networking diagram for implementing an NP service in an embodiment of the invention.

FIG. 5 shows a networking diagram for implementing an NP service in an embodiment of the present invention. The network includes a service applying and managing unit 51, an NP number management center 52, an NP delivery database 53, a local NP database 54, and a telephone exchange 55. The NP delivery database 53 and the local NP database 54 are uniformly referred to as an NP database.

The service applying and managing unit 51 is adapted to send the (B, B') received from the user to the NP number management center 52, where, B indicates a called user number and B' indicates a current routing number.

The NP number management center 52 is adapted to: receive the (B, B') sent from the service applying and managing unit 51, check whether the received (B, B') is valid, and send the valid (B, B') to the NP delivery database 53.

The NP delivery database 53 is adapted to: receive the (B, B') sent from the NP number management center 52, perform operations on B according to the preset algorithm, determine the ID(s) of one or more NP databases storing the (B, B'), and send the (B, B') to the determined NP database(s).

The local NP database 54 is adapted to: receive a query request sent from the telephone exchange 55, obtain a called user number B from the received query request, perform operations on B according to the preset algorithm, determine the ID of an NP database storing the (B, B') of the callee according to the operation result, send the query request to the determined NP database, and return the (B, B') sent from the NP database to the telephone exchange 55.

In this embodiment, the NP database 54 is further adapted to: receive the (B, B') sent from the telephone exchange 55, perform operations on B according to the preset algorithm, determine the ID of an NP databases storing the (B, B'), and send the (B, B') to the determined NP database.

The telephone exchange 55 is adapted to: receive the call from a caller, send the called number B carried in the call to the connected local NP database 54 through a query request, and route the call to the callee according to B' returned from the local NP database 54.

In this embodiment, the telephone exchange 55 is further adapted to: receive the (B, B') sent from a connected user terminal and send the (B, B') to the connected local NP database 54.

In actual applications, the NP delivery database 53 supports all the functions of the local NP database 54; and the local NP database 54 supports all the functions of the NP delivery database 53. That is, NP databases may be classified into NP delivery databases and local NP databases according to functions. Optionally, NP databases may not be classified. In this case, the functions of all the NP databases are the same; that is, each NP database acts as an NP delivery database and a local NP database at the same time.

Figure 6:
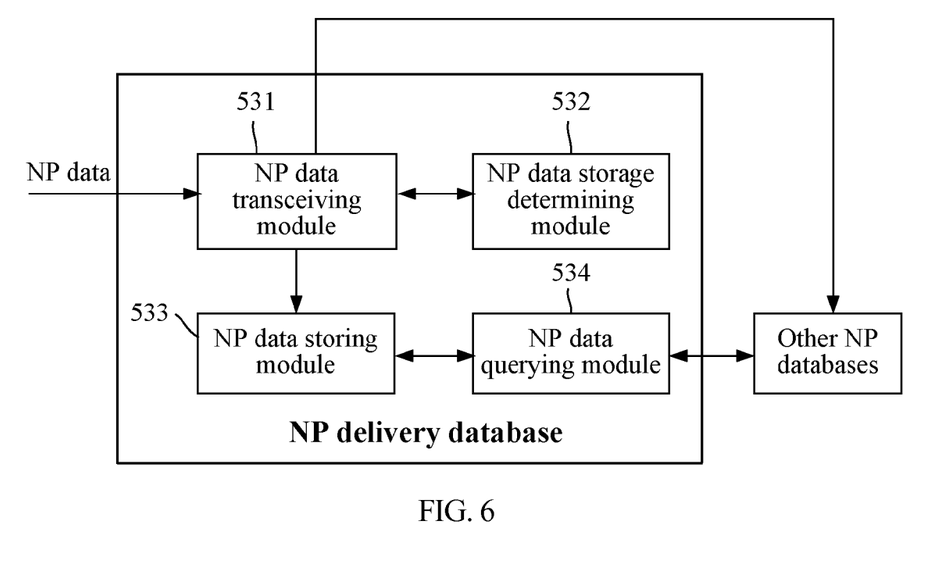
FIG. 6 shows a structure of an NP delivery database in an embodiment of the present invention.

FIG. 6 shows a structure of an NP delivery database in an embodiment of the present invention. The NP delivery database includes an NP data transceiving module 531 and an NP data storage determining module 532.

The NP data transceiving module 531 is adapted to: receive the (B, B') sent from the NP number management center 52, send B to the NP data storage determining module 532, receive the NP database ID sent from the NP data storage determining module 532, and send the (B, B') to the corresponding NP database according to the received NP database ID, where, B indicates a called user number and B' indicates a current routing number.

The NP data storage determining module 532 is adapted to: calculate the ID of the NP database storing the corresponding NP data according to B sent from the NP data transceiving module 531 and send the calculated ID to the NP data transceiving module 531.

In this embodiment, the NP delivery database 53 may further include an NP data storing module 533 and an NP data querying module 534.

The NP data storing module 533 is adapted to receive and store the NP data sent from the NP data transceiving module 531 of the NP delivery database 53 or other NP databases.

In addition, the NP data transceiving module 531 sends the (B, B') sent from the NP number management center 52 to the NP data storing module 533 when detecting that the NP database ID sent from the NP data storage determining module 532 is the same as the ID of the NP delivery database 53.

The NP data querying module 534 is adapted to: receive a query request carrying B sent from other NP database, query the NP data storing module 533 for B' corresponding to B, and send the (B, B') to the other NP database.

Figure 7:
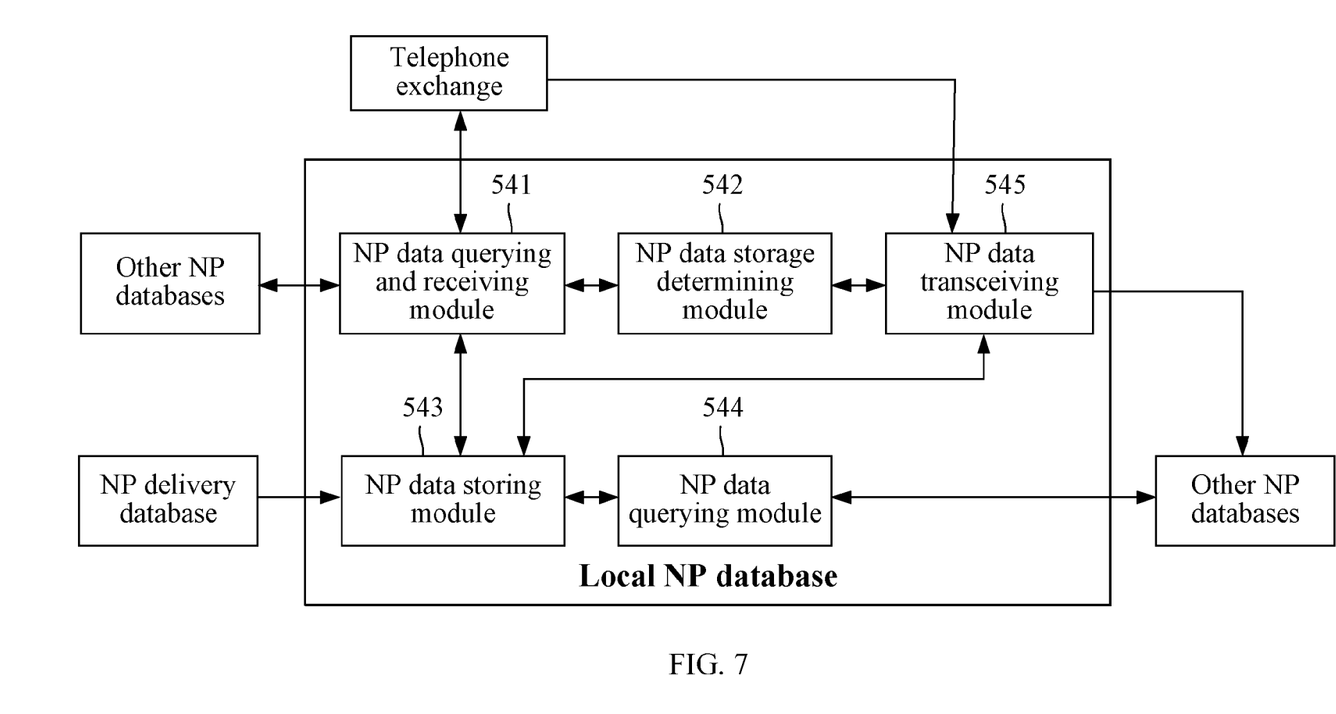
FIG. 7 shows a structure of a local NP database in an embodiment of the present invention.

FIG. 7 shows a structure of a local NP database in an embodiment of the present invention. The local NP database includes an NP data querying and receiving module 542, an NP data storage determining module 542, an NP data storing module 543, and an NP data querying module 544.

The NP data querying and receiving module 541 is adapted to: receive a query request carrying B sent from the telephone exchange 55, send B to the NP data storage determining module 542, receive the NP database ID sent from the NP data storage determining module 542, send the query request to the corresponding NP database according to the received NP database ID to obtain the corresponding (B, B'), and send the obtained (B, B') to the telephone exchange 55, where, B indicates a called user number and B' indicates a current routing number.

If the ID of the local NP database is sent from the NP data storage determining module 542, the NP data querying and receiving module 541 sends the query request carrying B to the NP data storing module 543.

The NP data storage determining module 542 is adapted to: receive B sent from the NP data querying and receiving module 541, calculate the ID of the NP database storing the corresponding NP data according to received B, and send the calculated ID to the NP data querying and receiving module 541.

The NP data storing module 543 is adapted to receive and store the NP data sent from the NP delivery database 53 or other NP databases.

The NP data querying module 544 is adapted to: receive a query request carrying B sent from other NP databases, query the NP data storing module 543 for B' corresponding to B, and send the (B, B') to the other NP databases.

In this embodiment, the local NP database may further include an NP data transceiving module 545. The NP data transceiving module 545 is adapted to: receive the (B, B') sent from the telephone exchange 55, send B in the received (B, B') to the NP data storage determining module 542, receive the NP database ID sent from the NP data storage determining module 542, and send the (B, B') to the corresponding NP database according to the received NP database ID.

If the ID of the local NP database is received, the NP data transceiving module 545 sends the (B, B') to the NP data storing module 543 of the local NP database.

It should be noted that the NP delivery database shown in FIG. 6 may have all the functions of the local NP database shown in FIG. 7 and the local NP database shown in FIG. 7 may also have all the functions of the NP delivery database shown in FIG. 6. For example, the NP data storing module 543 shown in FIG. 7 may have all the functions of the NP data storing module 533 shown in FIG. 6 and the NP data transceiving module 545 shown in FIG. 7 may also have all the functions of the NP data transceiving module 531 shown in FIG. 6.

In addition, in the embodiments of the present invention, the telephone exchange may be replaced by any switching device which supports switching functions.

The following describes a specific embodiment of the present invention.

Suppose that the Hash function is used to perform operations on B and that the algorithm is hash=$(X+Y+Z+P+Q+R+A+B+C+D+E)\%m$, where, % indicates a modulo operation, and XZYPQRABCDE indicates B, and m indicates a preset integer.

The following describes the processes of delivering and querying the NP service respectively.

(1) The NP Service Delivering Process

As shown in FIG. 5, suppose that the access point of user B (75528780848) is changed and that B' at the new access point is 59487294231.

The service applying and managing unit reports the new (B, B') to the NP number management center. The NP number management center checks whether the received (B, B') is valid and sends the valid (B, B') to the NP database 0.

The NP database 0 calculates Hash (B) (that is, Hash(B)=$(7+5+5+2+8+7+8+0+8+4+8)\%30=2$) and sends the (B,B') to the NP database 2, NP database 2+m, NP database 2+2m, . . . .

(2) The NP Service Querying Process

As shown in FIG. 5, user A (75526427370) calls user B (75528780848) and the access point of user A queries the connected NP database q for the NP data of user B.

The NP database q calculates Hash (B) (that is, Hash (B=2)). Then the NP database q sends a request for querying the NP data of user B to one of the NP database 2, NP database 2+m, NP database 2+2m, . . . , and returns the obtained (B, B') to the access point of user A. After receiving the (B, B'), the access point of user A originates a call to B' to find user B.

Through the preceding description of embodiments of the present invention, those skilled in the art may understand that embodiments of the present invention may be implemented by hardware or by software in combination with a necessary hardware platform. Thus, the technical solution of the present invention may be made into software. The software may be stored in a non-volatile storage medium such as a compact disc-read only memory (CD-ROM), a USB disk, or a mobile hard disk, and include several instructions that instruct a computer device such as a personal computer (PC), a server, or a network device to perform the methods provided in each embodiment of the present invention.

Although specific embodiments of the present invention have been described, it will be understood by those skill in the art that there are other embodiments that are equivalent to the described embodiments. Accordingly, it is to be understood that the invention is not to be limited by the specific illustrated embodiments, but only by the scope of the appended claims.

What is claimed is:

1. A method for implementing an Number Portability (NP) service, comprising:

receiving, by a local NP database, a called user number from a switching device, wherein the local NP database is one of NP databases storing NP data of users according to a preset correspondence between called user numbers and identifiers (IDs) of the NP databases storing the NP data of users;

determining, by the local NP database, an other NP database storing NP data of a callee according to the preset correspondence between the called user number and IDs of the NP databases storing the NP data of users; and obtaining, by the local NP database, the NP data of the callee from the determined other NP database and returning the obtained NP data to the switching device so that the switching device routes a call to the callee according to the returned NP data.

2. The method of claim 1, wherein, before receiving a called user number from a switching device, the method further comprises:

receiving, by an NP delivery database, NP data;

determining, by the NP delivery database, at least one of NP databases storing the NP data of the users according to preset correspondences between the called number and IDs of NP databases storing the NP data of users; and sending, by the NP delivery database, the NP data to the determined at least one of NP databases.

3. The method of claim 1, further comprising:

receiving, by an NP delivery database, NP data;

determining, by the NP delivery database, at least one of NP databases storing the NP data of the users according to preset correspondences between the called number and IDs of NP databases storing the NP data of users; and sending, by the NP delivery database, the NP data to the determined at least one of NP databases so that the NP databases storing the NP data may provide an NP service.

4. The method of claim 3, wherein, before receiving NP data by an NP delivery database, the method further comprises:

numbering, by a NP number management center, all NP databases;

selecting, by a NP number management center, the NP delivery database according to the serial number of the NP databases; and sending, by a NP number management center, the valid NP data to the selected NP delivery database.

5. The method of claim 3, wherein, the NP data comprises: a user number and the current routing number of the user.

6. A system for implementing an Number Portability (NP) service, comprising an NP database and a switching device, wherein the NP database comprises an NP delivery database and a local NP database, wherein the local NP database is one of NP databases storing NP data of users according to a preset correspondence between called user numbers and identifiers (IDs) of the NP databases storing the NP data of users;

the NP database is in communication with a switching device, the NP delivery database receives NP data selects at least one of NP databases storing the received NP data according to a user number in the NP data, and sends the received NP data to at least one of the selected NP databases;

the local NP database receives a called user number from a telephone exchange, determines an NP database storing the NP data of a callee according to the received called number, obtains the NP data of the callee from the determined NP database, and sends the obtained NP data to the switching device; and the switching device receives a call from a caller, sends the called number to the local NP database where the caller resides, and routes the call to the callee according to the NP data returned from the local NP database.

7. The system of claim 6, wherein the system further comprising a service applying and managing unit and an NP number management center, wherein:

the service applying and managing unit is capable of communicating with a NP number management center;

the service applying and managing unit sends the NP data received from the user to the NP number management center; and the NP number management center sends the NP data received from the service applying and managing unit to the NP delivery databases.

8. The system of claim 6, wherein, the switching device is further adapted to receive the NP data from the user, and send the received NP data to the local database;

the local database is further adapted to receive NP data form the switching device, select at least one of NP databases storing the received NP data according to a user number in the NP data, and send the NP data to at least one of the selected NP database.

9. The system of claim 7, wherein the quantity of the NP delivery databases is more than one, and the NP number management center further selects an current valid NP delivery database from all the NP delivery databases, and sends the NP data received from the service applying and managing unit to the selected NP delivery database.

10. An Number Portability (NP)database, comprising an NP data storing module, an NP data transceiving module and an NP data storage determining module, wherein, the NP data storing module stores NP data of users according to a preset correspondence between called user numbers and identifiers (IDs) of the NP databases storing the NP data of users;

the NP data transceiving module is capable of communicating with an NP data storage determining module;

the NP data transceiving module receives NP data sends an user number in the received NP data to the NP data storage determining module, receives the NP database ID from the NP data storage determining module, and sends the NP data to at least one of the NP databases corresponding to the received NP database ID; and the NP data storage determining module calculates the NP database ID storing the NP data of the user according to the received user number from the NP data transceiving module and sends the calculated NP database ID to the NP data transceiving module.

11. The NP database of claim 10, further comprising an NP data querying module, wherein:

the NP data storing module is capable of communicating with an NP data querying module;

the NP data storing module receives the NP data from the NP data transceiving module of the NP delivery database or other NP databases;

the NP data transceiving module further sends the received NP data to the NP data storing module after determining the NP database ID from the NP data storage determining module is the same as the ID of the NP delivery database; and the NP data querying module receives a query request carrying an user number from the other NP database, queries the NP data corresponding to the user number from the NP data storing module, and sends the queried NP data to the other NP database.

12. The NP database of claim 10, further comprising an NP data querying and receiving module, wherein:

the NP data querying and receiving module is capable of communicating with an NP data querying module;

the NP data querying and receiving module receives a called user number from a switching device, sends the received called number to the NP data storage determining module, receives an NP database ID from the NP data storage determining module, obtains the NP data corresponding to the user number from the NP database corresponding to the received NP database ID, and sends the obtained NP data to the switching device so that the switching device may route the call to the callee according to the received NP data; and the NP data storage determining module receives the called number from the NP data querying and receiving module, calculates the NP database ID storing the NP data of the callee according to the called number, and sends the calculated NP database ID to the NP data querying and receiving module.

13. The NP database of claim 12, further comprising:

an NP data storing module, adapted to receive the NP data from other NP databases; and an NP data querying module, adapted to receive a query request carrying an user number from the other NP database, query the NP data corresponding to the user number from the NP data storing module, and send the queried NP data to the other NP database.

14. The NP database of claim 12, further comprising:

an NP data transceiving module, adapted to receive the NP data, send a called user number in the received NP data to the NP data storage determining module, receive an NP database ID from the NP data storage determining module, and send the received NP data to the NP database corresponding to the received NP database ID.

15. The database of claim 14, wherein the NP data transceiving module further receives the NP data from the switching device, sends the user number in the received NP data to the NP data storing and determining module, receives the NP database ID from the NP data storing and determining module, and sends the NP data to the NP database corresponding to the NP database ID.

* * * * *

UNITED STATES PATENT AND TRADEMARK OFFICE
CERTIFICATE OF CORRECTION

PATENT NO.         : 8,498,400 B2                                                 Page 1 of 1
APPLICATION NO.    : 12/638535
DATED              : July 30, 2013
INVENTOR(S)        : Wen It is certified that error appears in the above-identified patent and that said Letters Patent is hereby corrected as shown below:

In the Claims

Column 10, Line 27, In Claim 8, delete "form" and insert -- from --, therefor.
Column 10, Line 30, In Claim 8, delete "NP database." and insert -- NP Databases. --, therefor.
Column 10, Line 38, In Claim 10, delete "(NP)database," and insert -- (NP) database, --, therefor.

Signed and Sealed this
First Day of July, 2014

Michelle K. Lee
*Deputy Director of the United States Patent and Trademark Office*